United States Patent [19]

Dragon et al.

[11] Patent Number: 6,075,075

[45] Date of Patent: Jun. 13, 2000

[54] USE OF AQUEOUS POLYMER DISPERSIONS FOR MODIFYING MINERAL BUILDING MATERIALS

[75] Inventors: Andree Dragon, Speyer; Rolf Gulden, Frankenthal; Maximilian Angel, Schifferstadt, all of Germany

[73] Assignee: BASF Aktiengesellschaft, Ludwigshafen, Germany

[21] Appl. No.: 08/679,568

[22] Filed: Jul. 15, 1996

[51] Int. Cl.[7] .............................. C08J 5/10; C08K 3/00; C08L 33/00
[52] U.S. Cl. ............................. 524/2; 524/5; 524/560; 526/317.1
[58] Field of Search ................... 524/560, 2, 5, 524/3; 526/317.1, 318, 318.1, 318.2, 318.25, 318.3, 318.4

[56] References Cited

U.S. PATENT DOCUMENTS

| 4,265,977 | 5/1981 | Kawamura et al. | 428/511 |
|---|---|---|---|
| 5,696,185 | 12/1997 | Beckerle et al. | 524/5 |

FOREIGN PATENT DOCUMENTS

| 0 629 650 | 12/1994 | European Pat. Off. . |
| 0 630 919 | 12/1994 | European Pat. Off. . |
| 0 698 586 | 2/1996 | European Pat. Off. . |
| 134 760 | 3/1979 | Germany . |
| 43 17 036 | 11/1994 | Germany . |

OTHER PUBLICATIONS

Chemical Abstracts, vol. 111, No. 4, Jul. 24, 1989, AN–24110, PL–138 319, Feb. 29, 1988.

*Primary Examiner*—James J. Seidleck
*Assistant Examiner*—U. K Rajguru
*Attorney, Agent, or Firm*—Oblon, Spivak, McClelland, Maier & Neustadt, P.C.

[57] ABSTRACT

Aqueous polymer dispersions whose polymer is composed of up to <5% by weight of (meth)acrylic acid, up to <5% by weight of (meth)acrylamide and from 90 to 97.5% by weight of other nonionic unsaturated monomers and is present as dispersed polymer particles having a weight average diameter of from 100 to 300 nm are used for modifying mineral building materials.

35 Claims, No Drawings

USE OF AQUEOUS POLYMER DISPERSIONS FOR MODIFYING MINERAL BUILDING MATERIALS

The present invention relates to the use of aqueous polymer dispersions whose polymer present as the disperse phase is composed of, based on its total weight, from >0 to <5% by weight of (meth)acrylic acid and/or one of its salts (monomers I), from >0 to <5% by weight of (meth)acrylamide (monomers II) and, as the remaining amount, from 90 to 97.5% by weight of other nonionic monomers having at least one ethylenically unsaturated group (monomers III)

in a form obtained by free radical polymerization, and is present in the form of polymer particles whose weight average diameter is from 100 to 300 nm, for modifying mineral building materials. In this publication, (meth)acrylic acid means acrylic acid and/or methacrylic acid. (Meth) acrylamide means acrylamide and/or methacrylamide.

The present invention furthermore relates to processes for the preparation of aqueous polymer dispersions to be used according to the invention, and to said aqueous polymer dispersions themselves.

Aqueous polymer dispersions (latices) are generally known. They are fluid systems which contain, as the disperse phase in an aqueous dispersing medium, polymer coils (ie. polymer particles) consisting of a plurality of intertwined polymer chains. The diameter of the polymer particles is in general mainly from 10 to 1000 nm (the term polymer is to be understood here as covering only those high molecular weight compounds which are obtainable by free radical polymerization of mixtures of monomers having at least one ethylenically unsaturated group, the predominant amount of the monomers of this mixture being such that they are not capable of generating an ionic charge on introduction into neutral (pH=7) water at 25 ° C. and 1 atm; such monomers are to be defined here as nonionic monomers).

Furthermore, mineral binders are generally known. These are pulverulent inorganic substances, such as lime, gypsum and/or in particular cement, which are converted into their ready-to-use form by stirring with water, the latter setting to a stone-like material as a function of time when left alone in the air or under water. They are usually used for the preparation of mineral building materials, such as mortars or concretes, by adding finely divided or coarse aggregates, such as sand or stones, during mixing with water.

It is also generally known that, in order to control their property profile, mineral building materials are used in a form modified with polymer. Suitable modifying polymers are polymers composed of a very wide range of monomers (cf., for example U.S. Pat. No. 4,340,510, GB-PS 1 505 558, U.S. Pat. No. 3,196,122, U.S. Pat. No. 3,043,790, U.S. Pat. No. 3,239,479, DE-A 4 317 035, DE-A 4 317 036, DE-A 43 20 220, EP-A 537 411, DE-B 16 69 903, BE-A 84 54 499, JP-A 54/43285, U.S. Pat. No. 4,225,496, DE-A 32 20 384, DE-A 28 37 898, U.S. Pat. No. 3,232,899, DD-134 760 and JP-A 91/131533).

The modifying effect is frequently not so much a question of the chemical nature of the modifying polymer as a matter of its physical properties. Such physical properties are primarily the glass transition temperature (cf. for example Austrian Patent 359 904 and EP-A 537 411) and the average molecular weight (cf. for example DE-A 43 17 036 and DE-A 43 17 035) of the polymer.

It is also generally known that the modifying effect of the polymers added to the particular mineral building material is better displayed in said building material the more finely divided the form in which the polymer is added to the mineral building material.

These modifying polymers are therefore usually introduced in the form of their aqueous polymer dispersions. The advantages of this procedure are based, inter alia, on the fact that an aqueous polymer dispersion contains the polymer already in finely divided form on the one hand and, on the other hand, contains the water in any case required for mixing as the dispersing medium. On the basis of the above statements, particularly advantageous aqueous polymer dispersions are usually those whose dispersed polymer particles have a particularly small diameter.

The disadvantage of the application form aqueous polymer dispersion is that it may not be completely satisfactory as a commercial form. Thus, transporting it to the place of use implies not only transporting the modifying polymer but always transporting the (mixing) water readily available everywhere; on the other hand, the mineral binder cannot be added to it until it reaches the place of use, since it would otherwise harden before use.

The most advantageous application form of the modifying polymer additive from the abovementioned points of view is therefore that of the polymer powder which is obtained starting from its very finely divided aqueous polymer dispersion by drying and is redispersible in an aqueous medium (a particularly advantageous method for converting an aqueous polymer dispersion is the spray drying method in which the aqueous polymer dispersion is sprayed in a warm air current and is dewatered; the drying air and the sprayed aqueous polymer dispersion are preferably fed cocurrent through the dryer; if required, drying assistants are present in a manner known per se; cf. for example EP-A 262 326 or EP-A 407 889).

However, the problem with aqueous polymer dispersions is that the state of the disperse polymer particles is as a rule thermodynamically unstable, ie. the system attempts to reduce the size of the dispersed polymer particles/aqueous dispersing medium interface by a procedure in which a plurality of the finely divided primary polymer particles combine to form larger secondary polymer particles (coagulum). With a given polymer content of aqueous polymer dispersion, the state of affairs is all the more critical the more finely divided the polymer particles present in dispersion, since the abovementioned interface grows disproportionally with decreasing polymer particle diameter.

It is furthermore generally known that the stability of the disperse polymer particles can be maintained with the aid of water-soluble dispersants, often over a period of ≧1 month, frequently even over a period of ≧3 months or ≧6 months (cf. for example F. Hölscher, Dispersionen synthetischer Hochpolymerer, Part I, Springer-Verlag, New York, (1969)).

Very generally, dispersants are substances which are capable of stabilizing the dispersed polymer/aqueous dispersing medium interface. Their total amount can be divided into two groups: a) protective colloids; b) emulsifiers. The latter in turn can be divided into: a) anionic emulsifiers; b) cationic emulsifiers; c) nonionic emulsifiers. The stabilizing effect of the protective colloids is primarily due to steric shielding of the dispersed polymer particles. As a rule, these are substances whose molecular weight is above 1500. They may be either chemically bonded or only physically bound to the dispersed polymer particles.

However, the disadvantage of most protective colloids is on the one hand the high preparation costs compared with emulsifiers. Furthermore, protective colloids in the widest sense are themselves polymeric materials which as a rule therefore adversely affect the actual modifying polymer. Protective colloids are furthermore incapable of forming micelles in an aqueous medium. Finally, this is why finely divided aqueous polymer dispersions are difficult to prepare using protective colloid stabilization alone.

The stabilizing effect of emulsifiers whose molecular weight is regularly <1500 is due to the fact that they have an amphiphilic structure (polar part and nonpolar part) and are therefore capable of reducing the interfacial tension at the polymer/aqueous dispersing medium interface. If the polar part is a cationic group, the term cationic emulsifier is used. If the polar part is an anionic group, the substance is an anionic emulsifier. In the case of a nonionic polar part, the term nonionic emulsifier is used. In contrast to protective colloids, emulsifiers are capable of forming micelles in water. Furthermore, they are such that, when added to water at 25 ° C. and 1 atm, they reduce the surface tension of the water by at least 25% when the critical micelle formation concentration is reached.

The predominant amount of cationic emulsifiers is such that their cationic character exists only in the presence of an acidic aqueous dispersing medium.

They are therefore fairly unsuitable for stabilizing aqueous polymer dispersions which are used for modifying mineral building materials, since mineral binders are usually alkaline. This neutralizes the acidic aqueous dispersing medium, which leads to deactivation of the cationic emulsifier and therefore finally to coagulation of the dispersed polymer, which prevents uniform distribution in the mineral building material and thus considerably reduces the desired modifying effect.

Anionic emulsifiers are suitable only to a limited extent for stabilizing aqueous polymer dispersions which are to be used for modifying mineral building materials, since their stabilizing effect is adversely affected by the polyvalent metal ions (eg. $Ca^{2+}$) present in mineral binders. This is often compensated by stabilizing the modifying aqueous polymer dispersion with an increased amount of anionic emulsifiers (particularly when a particularly finely divided aqueous polymer dispersion is being used).

However, the disadvantage of this measure is that emulsifiers are capable of stabilizing not only the dispersed polymer/aqueous dispersing medium interface but also the air/aqueous dispersing medium interface.

Consequently, aqueous polymer dispersions having a high emulsifier content tend to foam. However, foam formation during stirring of a mortar for the preparation of a mineral building material generally leaves undesirable pores in the latter after solidification, which pores adversely affect the mechanical properties of the solidified mineral building material.

Another possible method for remedying the deficiencies of anionic emulsifiers is to use them together with nonionic emulsifiers or to use exclusively nonionic emulsifiers. This recommendation is given, for example, in EP-A 537 411, GB-16 04 733 and German Published Application DAS 2,416,481, the last-mentioned in particular starting from at least 2% by weight of nonionic emulsifiers, in an amount based on the amount of the dispersed polymer, if the polymer dispersion is to be stable to divalent electrolytes. However, the disadvantage of nonionic emulsifiers is that, in contrast to the ionic emulsifiers, their polar part is not point-like (as in the case of a charged group) but as a rule tends to be chain-like (for example, a polyether chain). This property results in nonionic emulsifiers usually acting on polymers as external plasticizers. This means that a polymer having a certain glass transition temperature Tg acts, in the presence of nonionic emulsifiers, like a,polymer having a glass transition temperature Tg-X (effective glass transition temperature). This alone is undesirable since the contribution of X is frequently unforeseeable, making it difficult to adopt a specific approach. A further advantage, however, is that the emulsifiers used in aqueous polymer dispersions are water-soluble and are therefore washed out as a function of time under the action of, for example, rain or, owing to their low molecular weight, may also migrate to the surface of the mineral building material. In both cases, this results in the modifying polymer having an effective glass transition temperature which changes as a function of time and hence in a modifying action thereof which changes with time, which is undesirable.

A combination of anionic emulsifiers with cationic emulsifiers is likewise unsuitable as a possible solution since anionic and cationic emulsifiers have a compensating effect in their action.

A further possibility for stabilizing aqueous polymer dispersions is known to consist in polymerizing larger amounts of ethylenically unsaturated carboxylic acids and rendering the aqueous dispersant alkaline. However, the disadvantage of this method of stabilization is that it too is reduced to a certain extent by polyvalent cations. It is also known that at least polyacrylic acid slows down the solidification of mineral binders after mixing with water.

According to the invention, it has been found that aqueous polymer dispersions whose polymer present as the disperse phase is composed of, based on its total weight, from >0, preferably $\geq 0.5$) to <5% by weight of (meth) acrylic acid and/or one of its salts (monomers I), from >0 (preferably $\geq 0.5$) to <5% by weight of (meth) acrylamide (monomers II) and, as the remaining amount, from 90 (preferably at least 93) to 97.5 (preferably 96) % by weight of other nonionic monomers having at least one ethylenically unsaturated group (monomers III) in the form obtained by free radical polymerization, with a weight average diameter $\bar{d}_w$ of the dispersed polymer particles of from $\geq 100$ nm to $\leq 300$ nm (hence also with a $\bar{d}_w$ of from $\geq 100$ nm to $\leq 200$ nm), on the one hand can be stabilized in a satisfactory manner (coagulum formation <1% by weight, based on polymer, in the preparation) with a total amount of from >0 to $\leq 3\%$ by weight, based on the dispersed polymer, of dispersant, this amount of dispersant comprising no cationic emulsifier and not more than 1% by weight, based on the dispersed polymer, of nonionic emulsifier and at least 50% by weight of anionic emulsifier, so that the aqueous polymer dispersions possess cement stability (ie. the polymer dispersion does not coagulate when incorporated into cement) and, on the other hand, cause essentially no delay in the solidification of the mineral binder. Such aqueous polymer dispersions and the redispersible polymer powders obtainable from them in a manner known per se are therefore particularly suitable for modifying mineral building materials.

As a rule, the amount of dispersant in the aqueous polymer dispersions to be used according to the invention is at least 0.25% by weight, based on the dispersed polymer. In general, as little as from 0.25 to 2% by weight of from 0.25 to 1.5% by weight, based on the dispersed polymer, of dispersant is sufficient. It is noteworthy that in general even from 0.25 to 1% by weight or from 0.5 to 0.9% by weight, based on the dispersed polymer, of dispersant is sufficient. It is particularly surprising that the dispersant need not comprise a protective colloid or any nonionic emulsifier, ie. the required stability is also obtained when the dispersant comprises exclusively anionic emulsifier or the amount of nonionic emulsifier is <0.5% by weight, based on polymer.

The abovementioned is applicable in particular when the dispersed polymer contains from 1 to 3% by weight of monomers I and from 1 to 3% by weight of monomers II as polymerized units. Very generally, the weight ratio of polymerized monomers I to polymerized monomers II is preferably from 3:1 to 1:1. A preferred monomer I is acrylic acid and a preferred monomer II is acrylamide. These two monomers are advantageously used as sole monomers I and II. Preferred salts of the monomers I are their alkali metal salts, in particular the sodium and potassium salts. However, the ammonium salts are also suitable.

The number average molecular weight of the polymer contained in the aqueous polymer dispersions to be used according to the invention or in the redispersible polymer powders resulting from them may be from 50 000 to $3 \cdot 10^6$ or more. Frequently, the number average molecular weight is from 250 000 to $1.5 \cdot 10^6$.

Suitable monomers III for the dispersion polymers to be used according to the invention include in particular non-ionic monomers which are capable of free radical polymerization in a simple manner, such as the olefins, eg. ethylene, vinylaromatic monomers, such as styrene, α-methylstyrene, o-chlorostyrene or vinyltoluenes, vinyl and vinylidene halides, such as vinyl and vinylidene chloride, esters of vinyl alcohol and monocarboxylic acids of 1 to 18 carbon atoms, such as vinyl acetate, vinyl propionate, vinyl n-butyrate, vinyl laurate, vinyl pivalate and vinyl stearate, and commercially available monomers VEOVA® 9–11 (VEOVA X is a tradename of Shell and represents vinyl esters of carboxylic acids, which are also referred to as Versatice® X acids), esters of α,β-monoethylenically unsaturated carboxylic acids, preferably of 3 to 6 carbon atoms, such as acrylic acid and methacrylic acid, with alkanols of in general 1 to 12, preferably 1 to 8, in particular 1 to 4, carbon atoms, in particular methyl, ethyl, n-butyl, isobutyl, tert-butyl and 2-ethylhexyl acrylate and methacrylate, nitriles of α,β-monoethylenically unsaturated carboxylic acids, such as acrylonitrile, and conjugated $C_4$–$C_8$-dienes, such as 1,3-butadiene and isoprene. Monomers which increase the internal strength of the films of the aqueous polymer dispersions may also be copolymerized in minor amounts, such as monomers having two vinyl radicals or two vinylidene radicals or two alkenyl radicals. Examples are the diesters of dihydric alcohols with α,β-monoethylenically unsaturated monocarboxylic acids, among which acrylic and methacrylic acid are preferred.

The amounts by weight of the various possible monomers III to be copolymerized are usually chosen in a simple manner so that the glass transition temperature Tg (midpoint temperature according to ASTM D 3418-82) of the film of the aqueous polymer dispersion to be used according to the invention has the magnitude which corresponds to the desired modifying effect and is usually from −70 to 110° C.

The Fox relationship may be used in this context. According to Fox (T.G. Fox, Bull. Am. Phys. Soc. (Ser. II) 1, [1956], 123) and Ullmanns Encyklopädie der technischen Chemie, Vol. 19, 4th Edition, Verlag Chemie, Weinheim (1980), pages 17 and 18, the following is a good approximation of the glass transition temperature of copolymers:

$$\frac{1}{Tg} = \frac{X^1}{Tg^1} + \frac{X^2}{Tg^2} + \ldots \frac{X^n}{Tg^n},$$

where $X^1, X^2, \ldots, X^n$ are the mass fractions $1, 2, \ldots, n$ and $Tg^1, Tg^2, \ldots, Tg^n$ are the glass transition temperatures, in degrees Kelvin, of the polymers composed in each case only of one of the monomers $1, 2, \ldots, n$. The glass transition temperature Tg of these homopolymers of the abovementioned monomers are known and are stated, for example, in J. Brandrup, E. H. Immergut, Polymer Handbook $1^{St}$ Ed., J. Wiley, New York 1966, $2^{nd}$ Ed., J. Wiley, New York 1975 and $3^{rd}$ Ed., J. Wiley, New York, 1989, and in Ullmann's Encyclopedia of Industrial Chemistry, VCH, Weinheim, Vol. A21 (1992), page 169.

If an elastifying modifying effect of the aqueous polymer dispersion to be used according to the invention is desired, Tg is advantageously chosen to be below 0° C. (cf. AT-359904). If a modifying effect according to EP-A 537 411 is desired, Tg is advantageously chosen to be ≧30° C.

A Tg of from 0 to 25° C. is particularly suitable for modifying repair mortar.

Against this background, particularly suitable monomers III are butadiene (as a particularly soft monomer), styrene (as a particularly hard monomer) and mixtures thereof, since the total suitable glass transition temperature range can be obtained simply by varying the composition of the butadiene/styrene mixture. Moreover, the question of hydrolysis stability in an aqueous alkaline medium arises neither in the case of styrene nor in the case of butadiene.

Consequently, aqueous polymer dispersions which are particularly preferably to be used according to the invention are those whose polymer present as the disperse phase is composed of, based on its total weight, from >0 to <5% by weight of (meth)acrylic acid and/or one of its salts, from >0 to <5% by weight of (meth)acrylamide and, as the remaining amount, from 90 (preferably 93) to 97.5 (preferably 96) % by weight of butadiene and/or styrene in the form obtained by free radical polymerization.

Protective colloids suitable for stabilizing aqueous polymer dispersions to be used according to the invention are, for example, polyvinyl alcohols, cellulose derivatives or vinylpyrrolidone-containing copolymers. A detailed description of further suitable protective colloids is to be found in Houben-Weyl, Methoden der organischen Chemie, Volume XIV/1, Makromolekulare Stoffe, Georg-Thieme-Verlag, Stuttgart, 1961, pages 411 to 420. Examples of suitable nonionic emulsifiers are ethoxylated mono-, di- and trialkylphenols (degree of ethoxylation: from 3 to 100, alkyl radical: $C_4$ to $C_{12}$) and ethoxylated fatty alcohols (degree of ethoxylation: from 3 to 100, alkyl radical: $C_8$ to $C_{18}$).

Particularly suitable anionic emulsifiers are the alkali metal (in particular Na and K) and ammonium salts of hydrophobic radicals carrying anionic groups, such as sulfate, sulfonate, carboxylate, phosphate and phosphonate, among which those of the sulfate type and of the sulfonate type are preferred. Examples are the alkali metal (in particular Na and K) and ammonium salts of anionic emulsifiers of the sulfate or sulfonate type, for example of α-sulfo fatty acids (10 to 20 carbon atoms in the carbon chain), of sulfosuccinic esters (6 to 12 carbon atoms in the alcohol component), of alkylsulfates (alkyl radical: $C_8$ to $C_{16}$), of alkylsulfonic acids (alkyl radical: $C^{12}$ to $C^{18}$) and of alkoxyarylsulfonic acids (alkyl radical: $C_9$ to $C_{18}$), such as alkylbenzenesulfonic acids or alkylnaphthalenesulfonic acids.

Compounds of the general formula I (alkylsulfodiphenyl ethers)

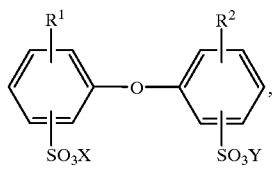

(I)

where $R^1$ and $R^2$ are each hydrogen or $C_4$–$C_{24}$-alkyl and are not simultaneously hydrogen and X and Y may be alkali metal ions and/or ammonium ions, have also proven particularly suitable anionic emulsifiers. In the formula I, $R^1$ and $R^2$ are each preferably linear or branched alkyl of 6 to 18, in particular 6, 12 or 16, carbon atoms or hydrogen, $R^1$ and $R^2$ not both being hydrogen simultaneously. X and Y are preferably sodium, potassium or ammonium ions, sodium being particularly preferred. Advantageous compounds I are those in which X and Y are each sodium, $R^1$ is branched alkyl of 12 carbon atoms and $R^2$ is hydrogen or $R^1$. Industrial mixtures which contain from 50 to 90% by weight of mono-alkylated product are frequently used, for example Dowfax® 2A1 (trademark of Dow Chemical Company) and Dowfax 2 EP. Succinates and alkali metal and ammonium salts of fatty acids are furthermore suitable.

It is surprising that the aqueous polymer dispersions to be used according to the invention can be stabilized by exclusively anionic emulsifiers as dispersants in an amount of ≦3% by weight, based on dispersed polymer.

Preferred anionic emulsifiers are mixtures of compounds of the general formula I (in particular the active ingredient corresponding to Dowfax 2 EP) and the stated alkylsulfates, alkyl sulfonates and/or alkylarylsulfonates (in particular sodium, potassium and ammonium laurylsulfate). This applies in particular when the monomers III are mixtures of butadiene and styrene. The anionic emulsifiers of the aqueous polymer dispersions to be used according to the invention preferably have no polyether groups. Furthermore, the emulsifiers required according to the invention have as a rule no group capable of free radical polymerization, at least in the cases where they are already present during the polymerization.

The preparation of the aqueous polymer dispersions to be used according to the invention can be carried out by the conventional methods of free radical aqueous emulsion polymerization.

Suitable free radical polymerization initiators for the main polymerization reaction described above are all those which are capable of initiating a free radical aqueous emulsion polymerization. They may be both peroxides and azo compounds. However, redox initiator systems are of course also suitable. The use of peroxodisulfuric acid and/or its alkali metal salts (in particular K and Na salt) and/or its ammonium salt and its free radical initiators is preferred, particularly if the monomers III are styrene/butadiene mixtures. However, hydrogen peroxide, tert-butyl hydroperoxide or other organic peroxides can of course also be used. The amount of initiator used is as a rule from 0.3 to 2% by weight, based on the amount of monomers to be polymerized.

The polymerization temperature is usually from 20 to 100° C. and is adapted in each case to the polymerization initiator used. If peroxodisulfuric acid or its salts are used as polymerization initiators, the polymerization temperature is typically from 70 to 90° C. The working pressure for the free radical aqueous emulsion polymerization is usually 1 atm. In the case of copolymerization of readily volatile monomers, such as butadiene, it may be up to 10 atm.

The pH of the aqueous dispersing medium is as a rule from 2 to 5 during the free radical aqueous emulsion polymerization. Buffer systems, such as sodium pyrophosphate, may be present in order to keep the pH in this range. After the end of the free radical aqueous emulsion polymerization, the pH of the aqueous dispersing medium is generally brought to 3–8, frequently 3–7. For example, ammonium, sodium hydroxide, potassium hydroxide, CaO or Ca(OH)$_2$ may be used as a neutralizing base in this context.

The free radical aqueous emulsion polymerization can be carried out both by the batch procedure and by the semicontinuous feed procedure, with or without seeding. In general, the seed used is a finely divided aqueous polymer dispersion having a weight average diameter of the polymer particles of from >0 to <200 nm, in general <100 nm. Frequently, it is a polystyrene seed. It is noteworthy that the cement stability of the aqueous polymer dispersions to be used according to the invention is higher when they contain from >0 (preferably >0.25) to ≦5% by weight, based on the dispersed polymer, of at least one substance which is capable of forming a chelate complex with $Ca^{2+}$. The molecular weight of this chelating agent is preferably ≦500. Examples of such chelating agents are the oxalate ion $C_2O_4^{2-}$, the tartrate ion $^-O_2C$—CHOH—CHOH—$CO_2^-$ and in particular the anion of ethylene-diaminetetraacetic acid and of nitrilotriacetic acid. In general, bidentate, tridentate and tetradentate chelating agents are preferred. Furthermore, the complex formation constant of the chelating agent with $Ca^{2+}$ should not be smaller than that of the oxalate ion (based on 25° C. and 1 atm). As a rule, the chelating agents are added during the free radical aqueous emulsion polymerization itself.

As a rule, the aqueous polymer dispersions to be used according to the invention are prepared with a solids content of from 35 to 70% by weight. The aqueous polymer dispersions thus obtainable can of course be diluted to the desired extent with mixing water before they are used to modify mineral building materials.

The aqueous polymer dispersions to be used according to the invention or the redispersible polymer powders obtained from these polymer dispersions by drying (cf. DE-A 39 23 229, EP-A 78449, DE-A 22 38 903, EP-A 56622 and DE-A 33 44 242) can advantageously be used as modifying additives for mineral building materials based on cement, their compatibility being substantially independent of the type of cement. Depending on the project, it is possible to use, for example, blast furnace cement, butiminous cement, water repellent Portland cement, fast-setting cement, highexpansion cement, high-alumina cement and particularly preferably Portland cement may be used.

Depending on the project, the amount of aqueous polymer dispersion or redispersible polymer powder to be added is from >0 to ≦80, frequently from ≧3 to ≦50, in general from ≧5 to ≦20, by weight, based on cement and on the dry state). In general, from 2 to 5 parts by weight of mineral additives, whose maximum dimension is as a rule from >0 to 32 mm, frequently from >0 to 4 mm, in general from >0 to 2 mm, are furthermore used per part by weight of cement.

The aqueous polymer dispersions to be used according to the invention are generally used without the addition of organic solvents, such as polyglycol, and without the addition of waxes.

One group of aqueous polymer dispersions to be used according to the invention is particularly noteworthy. These are aqueous polymer dispersions whose monomers III consist only of butadiene and styrene, the amounts of butadiene and styrene being chosen so that the glass transition temperature Tg of the film of the resulting aqueous polymer dispersion is from 0 to 50° C., preferably from 0 to 25° C. A composition of the monomers III comprising about 70% by weight of styrene and about 30% by weight of butadiene is particularly advantageous (the action of these abovementioned polymer dispersions is maintained at roughly the same level if up to one third of the molar amounts of copolymerized styrene is replaced by other vinylaromatics and/or (meth)acrylonitrile).

These aqueous polymer dispersions and the redispersible polymer powders obtainable from them by drying are particularly suitable for modifying cement-based repair mortar.

The polymer is generally added in an amount of from 3 to 20, advantageously from 5 to 10, % by weight, based on cement.

The repair mortar modified in this manner requires less mixing water than usual in order to achieve a ready-to-use state. Furthermore, such modified repair mortars have excellent stability in the ready-to-use state (they do not flow under their own weight), as required, for example, for repair mortars used on vertical surfaces or for overhead work.

Further advantages are good adhesion of the ready-to-use repair mortar to mineral surfaces and satisfactory mechanical strength in the solidified state. Typically, such modified repair mortars contain from 50 to 70 parts by weight of sand (arithmetic mean of the maximum particle diameter from 0.06 to 3 mm), from 20 to 30 parts by weight of cement, from 0 to 2 parts by weight of a thixotropic agent (eg. Elkem microsilica), from 0 to 0.3 part by weight of fibers, from 0.1 to 1.0 part by weight of antifoam, from 0 to 1 part by weight of plasticizer and the emulsion polymer in a polymer/cement ratio of from 0.05 to 0.20.

The purpose of adding the thixotropic agent is additionally to reduce the flowability of the aqueous mortar before it solidifies while standing.

Those aqueous polymer dispersions to be used according to the invention which are based on styrene/butadiene and obtainable by the emulsion feed procedure are particularly advantageous.

This means that at least 90% by weight of the total amount of monomers to be polymerized are fed continuously to the polymerization vessel in a form preemulsified in an aqueous medium, at the rate at which they are consumed during the free radical aqueous emulsion polymerization. Since butadiene has two ethylenically unsaturated double bonds, up to 2% by weight, based on the total amount of the monomers to be polymerized, of molecular weight regulators, such as mercaptans, are advantageously added to the monomer emulsion. A preferred molecular weight regulator is tert-dodecyl mercaptan. The amount of molecular weight regulator used and the polymerization temperature are advantageously chosen so that the film of the aqueous polymer dispersion to be used according to the invention has a gel content of from 60 to 80, preferably from 65 to 75, % by weight.

Finally, it should be stated that the abovementioned aqueous polymer dispersions and their redispersible polymer powders obtainable by drying are also suitable as additives in aqueous bitumen emulsions and as binders for aqueous paper coating slips.

EXAMPLES a) Preparation of an Aqueous Polymer Dispersion to be Used According to the Invention 30.8 kg of water, 126 g of Dowfax 2 EP (45% strength by weight aqueous emulsifier formulation), 715 g of butadiene, 600 g of a 7% strength by weight aqueous sodium persulfate solution and 2.4 kg of a 30% strength by weight aqueous polystyrene dispersion (weight average polystyrene particle diameter=30 nm) which contained 20% by weight, based on polystyrene present, of sodium $C_{12}$-alkylbenzenesulfonate as an emulsifier were initially taken in a pressure-resistant vessel (flushed with $N_2$) and heated to 80° C. while stirring. After initiation of the polymerization, feeds A, B and C below were fed to the polymerization vessel at different points in the course of 4 hours, beginning at the same time, while maintaining the temperature of 80° C. After the end of the feeds, the reaction mixture was stirred for a further 2 hours at 80° C. and then cooled to room temperature. The polymerization conversion was >99.5% by weight (the amount of residual monomers can be reduced, for example, by chemical deodorization by means of tert-butyl hydroperoxide/Rongalite and/or physical deodorization, such as stripping with steam). The pH of the aqueous dispersing medium was then brought to 6.5 by means of a 25% strength by weight aqueous ammonia solution.

An aqueous polymer dispersion whose solids content was 50% by weight was obtained. The amount of coagulum formed during the polymerization was less than 0.5% by weight, based on the amount of monomers to be polymerized. The glass transition temperature of the film of the aqueous polymer dispersion was 23° C.

Feed A:

Homogeneous mixture of 35.4 kg of water, 9.9 kg of a 3% strength by weight aqueous sodium pyrophosphate solution, 500 g of a 0.4% strength by weight aqueous solution of sodium ethylenediamine-tetraacetate, 1200 g of Dowfax 2EP, 1650 g of a 15% strength by weight aqueous solution of sodium laurylsulfate, 1000 g of tert-dodecyl mercaptan, 3.47 kg of acrylic acid, 2.98 kg of a 50% strength by weight aqueous acrylamide solution and 63.4 kg of styrene;

Feed B: 30 kg of butadiene;

Feed C: 10.7 kg of a 7% strength by weight aqueous sodium persulfate solution.

The dispersed polymer had the following monomer composition:

64.2% by weight of styrene 30.8% by weight of butadiene 3.48% by weight of acrylic acid 1.52% by weight of acrylamide.

The weight average particle diameter of the disperse phase of this polymer was 160 nm. The disperse phase was stabilized with the following amounts by weight, based on the amount of polymer, of the following anionic emulsifiers:

0.599% by weight of the sodium salt of sulfonated dodecyldi-phenyl ether (Dowfax 2EP)

0.248% by weight of sodium laurylsulfate 0.144% by weight of sodium $C_{12}$-alkylbenzenesulfonate b) Gel Content of the Film of the Aqueous Polymer Dispersion Obtained Under a)

The 50% by weight aqueous polymer dispersion was cast in a wet film thickness of 1 mm and converted into a film at 25° C. A square test piece weighing 1 g was cut from the film and left alone in 100 ml of tetrahydrofuran at 23° C. for 48 hours (the content of the vessel was swirled briefly in each case at the beginning, after 12 hours and after 36 hours). After 48 hours, the content of the vessel was filtered through a metal sieve (40 μm). The residue remaining in the metal sieve was dried to constant weight at 50° C. and its mass was determined by weighing. The mass of the residue as a percentage of the mass of the original sample defines the gel content. It was 73% by weight.

c) Investigation of the Cement Stability of the Aqueous Polymer Dispersion from a)

50 g of the aqueous polymer dispersion were initially taken in a dish and 50 g of Portland cement PZ 45F were added slowly (in the course of 15 seconds) while stirring. After the end of the cement addition, the mixture was stirred for a further minute.

The resulting material was homogeneous and brushable, indicating the cement stability of the aqueous polymer dispersion (crumb-like or gelatinous materials are obtained when the cement is not stable).

d) Testing of Performance Characteristics of Cement Mortar Modified with the Aqueous Polymer Dispersion from a)

Composition of the mortar material:
  250 g of quartz sand according to DIN 1164, part 7, having a particle size of from 0.08 to 0.5 mm
  500 g of quartz sand according to DIN 1164, part 7, having a particle size of from 0.5 to 1.0 mm
  217 g of Portland cement 35F
  95 g of water
  55 g of aqueous polymer dispersion from a)

To check the performance characteristics, the processing properties of the freshly stirred mortar were tested by throwing it with a trowel at a dry concrete slab, ie. one which had not been wet beforehand.

The following properties I to IV were evaluated:
I. Immediate adhesion of the thrown mortar to the concrete slab (adhesion of the complete thrown material to the slab=1; total thrown material bounces off the concrete slab, ie. does not adhere=6)
II. Immediate stability of the mortar on the concrete slab (a thrown mortar cone of about 5 cm thickness shows no sagging on the slab=1; the mortar adheres to the slab but immediately flows down the wall=6)
III. Moldability (reworkability) and stability of the mortar on the concrete slab (the mortar has excellent molding properties and is stable even under the molding conditions=1; mortar falls off completely from the slab under the molding conditions or becomes fluid under the molding conditions and flows down the wall=6)
IV: Tack of the mortar on the tool (no tool tack=1; very great tack on the tool=6)

The results obtained are shown in the table below.

| Property | Evaluation |
|---|---|
| I | 1 |
| II | 1 |
| III | 1 |
| IV | 1 |

We claim:

1. A process for the preparation of mineral building materials modified with polymers, in which an aqueous dispersion of the modifying polymer is incorporated into a dry formulation containing a mineral binder and mineral additives, wherein the polymer present as the disperse phase in the aqueous polymer dispersion is composed of, based on its total weight,
  from <0 to >5% by weight of (meth)acrylic acid or one of its salts (monomers I),
  from >0 to <5% by weight of (meth)acrylamide (monomers II) and, as the remaining amount,
  from 90 to 97.5% by weight of other nonionic monomers having at least one ethylenically unsaturated group (monomers III)

in a form obtained by free radical polymerization, and is present in the form of polymer particles whose weight average diameter is from 100 to 300 nm and the glass transition temperature of a film of the aqueous polymer dispersion is from −70 to +100° C.

2. A process as claimed in claim 1, wherein the polymer present as the disperse phase contains from 93 to 96% by weight of monomers III as polymerized units in the form obtained by free radical polymerization.

3. A process as claimed in claim 1, wherein the weight average diameter of the polymer particles present as the disperse phase is from 100 to 200 nm.

4. A process as claimed in claim 1, wherein the total amount of dispersant in the aqueous dispersion of the modifying polymer is from >0 to ≦3% by weight, based on its amount, comprises not more than 1% by weight, based on the dispersed polymer, of nonionic emulsifier and comprises at least 50% by weight of anionic emulsifier.

5. A process as claimed in claim 4, wherein the total amount of dispersant is from 0.25 to 3% by weight, based on the dispersed polymer.

6. A process as claimed in claim 4, wherein the total amount of dispersant is from 0.25 to 2% by weight, based on the dispersed polymer.

7. A process as claimed in claim 4, wherein the total amount of dispersant is from 0.25 to 1.5% by weight, based on the dispersed polymer.

8. A process as claimed in claim 4, wherein the total amount of dispersant is from 0.25 to 1% by weight, based on the dispersed polymer.

9. A process as claimed in claim 4, wherein the total amount of dispersant is from 0.5 to <1% by weight, based on the dispersed polymer.

10. A process as claimed in claim 4, wherein the dispersant comprises no nonionic emulsifier.

11. A process as claimed in claim 4, wherein the dispersant consists exclusively of anionic emulsifiers.

12. A process as claimed in claim 1, wherein the polymer present as the disperse phase contains from 1 to 3% by weight of monomers I and from 1 to 3% by weight of monomers II as polymerized units.

13. A process as claimed in claim 1, wherein the polymer present as the disperse phase contains the monomers I and II as polymerized units in a weight ratio of from 3(I):1(II) to 1:1.

14. A process as claimed in claim 1, wherein the polymer present as the disperse phase contains, as polymerized units, acrylic acid or salts thereof as monomers I and acrylamide as monomer II.

15. A process as claimed in claim 1, wherein the glass transition temperature of the film of the aqueous polymer dispersion is from 0 to −70° C.

16. A process as claimed in claim 1, wherein the glass transition temperature of the film of the aqueous polymer dispersion is from 30 to 110° C.

17. A process as claimed in claim 1, wherein the monomers III are exclusively styrene or butadiene or styrene and butadiene.

18. A process as claimed in claim 17, wherein the glass transition temperature of the film of the aqueous polymer dispersion is from 0 to 50° C.

19. A process as claimed in claim 17, wherein the glass transition temperature of the film of the aqueous polymer dispersion is from 0 to 25° C.

20. A process as claimed in claim 17, wherein the monomers III consist of 70% by weight of styrene and 30% by weight of butadiene.

21. A process as claimed in claim 1, wherein the dispersant comprises at least one of the following emulsifiers: alkali metal and ammonium salts of alkylsulfates (alkyl radical: $C_8$ to $C_{16}$), alkali metal and ammonium salts of alkylsulfonic acids (alkyl radical: $C_{12}$ to $C_{18}$), alkali metal and ammonium salts of alkylarylsulfonic acids and alkali metal and ammonium salts of sulfonated diphenyl ethers.

22. A process as claimed in claim 1, wherein the aqueous polymer dispersion contains a compound which is capable of forming a chelate complex with $Ca^{2+}$.

23. A process as claimed in claim 1, wherein the aqueous polymer dispersion contains ethylenediaminetetraacetic acid or the anion thereof.

24. A process as claimed in claim 1, wherein the mineral binder is cement.

25. A process as claimed in claim 1, wherein the aqueous polymer dispersion is obtained by adding water to a mixture containing (1) said dry formulation containing mineral binder and mineral additives, and (2) the modifying polymer in the form of a dried redispersible powder.

26. A method of using of an aqueous polymer dispersion whose polymer present as the disperse phase is composed of, based on its total weight, from >0 to <5% by weight of (meth)acrylic acid or one of its salts (monomers I), from >0 to <5% by weight of (meth)acrylamide (monomers II) and, as the remaining amount, from 90 to 97.5% by weight of other nonionic monomers having at least one ethylenically unsaturated group (monomers III)

in a form obtained by free radical polymerization, and is present in the form of polymer particles whose weight average diameter is from 100 to 300 nm, as an additive in mineral building materials.

27. A redispersible polymer powder obtainable by drying an aqueous polymer dispersion whose polymer present as the disperse phase is composed of, based on its total weight, from >0 to <5% by weight of (meth)acrylic acid or one of its salts (monomers I), from >0 to <5% by weight of (meth)acrylamide (monomers II) and, as the remaining amount, from 90 to 97.5% by weight of other nonionic monomers having at least one ethylenically unsaturated group (monomers III)

in a form obtained by free radical polymerization, and is present in the form of polymer particles whose weight average diameter is from 100 to 300 nm.

28. An aqueous polymer dispersion whose polymer present as the disperse phase is composed of, based on its total weight, from >0 to <5% by weight of (meth)acrylic acid or one of its salts (monomers I), from >0 to <5% by weight of (meth)acrylamide (monomers II) and, as the remaining amount, from 90 to 97.5% by weight of other nonionic monomers having at least one ethylenically unsaturated group (monomers III)

in a form obtained by free radical polymerization, and is present in the form of polymer particles whose weight average diameter is from 100 to 300 nm, and whose total amount of dispersant is $\leq 3\%$ by weight, based on the dispersed polymer, comprises not more than 1% by weight, based on the dispersed polymer, of nonionic emulsifier and comprises at least 50% by weight of anionic emulsifier.

29. A process for the preparation of an aqueous polymer dispersion as claimed in claim 28, wherein the monomers are subjected to free radical aqueous emulsion polymerization.

30. A polymer powder obtainable by spray drying an aqueous polymer dispersion as claimed in claim 28.

31. The process of claim 24, wherein, based on the amount of cement, from >0 to $\leq 80\%$ by weight of aqueous polymer dispersion (dry basis) are incorporated.

32. The process of claim 24, wherein, based on the amount of cement, from $\geq 3$ to $\leq 50\%$ by weight of aqueous polymer dispersion (dry basis) are incorporated.

33. The process of claim 24, wherein, based on the amount of cement, from $\geq 5$ to $\leq 20\%$ by weight of aqueous polymer dispersion (dry basis) are incorporated.

34. The process of claim 1, wherein the aqueous polymer dispersion is obtained by adding the modifying polymer in the form of a dried redispersible powder to a formulation containing (1) said dry formulation containing mineral binder and mineral additives, and (2) water.

35. The process of claim 1, wherein the aqueous polymer dispersion is obtained by simultaneously adding water and the modifying polymer in the form of a dried redispersible powder, to a formulation containing said dry formulation containing mineral binder and mineral additives.

* * * * *

UNITED STATES PATENT AND TRADEMARK OFFICE
CERTIFICATE OF CORRECTION

PATENT NO. : 6,075,075
DATED : June 13, 2000
INVENTOR(S) : Andree Dragon et al.

It is certified that error appears in the above-identified patent and that said Letters Patent is hereby corrected as shown below:

<u>Title page,</u>
Item [30], should read as follows -- [30] Foreign Application Priority Data
July 19, 1995 [DE] Germany ............................. 195 26 336 --

Signed and Sealed this

Tenth Day of May, 2005

JON W. DUDAS
*Director of the United States Patent and Trademark Office*